(12) United States Patent
Haartsen (10) Patent No.: US 8,325,781 B2
(45) Date of Patent: Dec. 4, 2012

(54) DETECTING THE PRESENCE OF SPREAD SPECTRUM SIGNALS

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 374 days.

(21) Appl. No.: 12/665,031

(22) PCT Filed: Jun. 25, 2008

(86) PCT No.: PCT/EP2008/058096
§ 371 (c)(1),
(2), (4) Date: May 31, 2010

(87) PCT Pub. No.: WO2009/003897
PCT Pub. Date: Jan. 8, 2009

(65) Prior Publication Data
US 2010/0246636 A1    Sep. 30, 2010

Related U.S. Application Data

(60) Provisional application No. 60/947,485, filed on Jul. 2, 2007.

(30) Foreign Application Priority Data

Jun. 29, 2007 (EP) .................................... 07388049

(51) Int. Cl.
*H04B 1/00* (2006.01)
(52) U.S. Cl. ...................................................... 375/130
(58) Field of Classification Search .................. 375/130
See application file for complete search history.

(56) References Cited

U.S. PATENT DOCUMENTS

| 4,731,801 | A | * | 3/1988 | Henriksson | 375/347 |
| 6,151,313 | A | * | 11/2000 | Abramson | 370/342 |
| 7,555,033 | B2 | * | 6/2009 | Lillo et al. | 375/150 |

OTHER PUBLICATIONS

Ghavami, "Detection of DS-SS Signals over Fading Channels without Prior Knowledge of Spreading Sequence by Measuring Signal Nongaussianity" 2006 IEEE 17th International Symposium on Personal, Indoor and Mobile Radio Communications, Date of Conference: Sep. 11-14, 2006 on pp. 1-5.*

Fishier, "Detection of Signals by Information Theoretic Criteria: General Asymptotic Performance Analysis", IEEE Trans on Signal Processing, vol. 50, No. 5, pp. 1027-1036, 2002.*

(Continued)

*Primary Examiner* — Juan A Torres
(74) *Attorney, Agent, or Firm* — Potomac Patent Group PLLC (57) ABSTRACT

The presence of spread spectrum signals in a given frequency range is detected in a receiver by receiving a signal; determining for a measurement frequency an indication signal; and using it as an indication of the presence of spread spectrum signals having a carrier frequency equal to the measurement frequency. An in-phase signal and a quadrature signal are provided by mixing the received signal with an oscillator signal having the measurement frequency; at least one of these signals is phase shifted; a sum signal and a difference signal are generated; and the sum signal is multiplied by the difference signal and low pass filtered. In this way a method and a circuit of detecting the presence of spread spectrum signals in a given frequency range are provided, which are simple and fast enough to be used in low-cost cognitive radios.

14 Claims, 5 Drawing Sheets

OTHER PUBLICATIONS

Kuehls, "Presence detection of binary-phase-shift-keyed and direct-sequence spread-spectrum signals using a prefilter-delay-and-multiply device" IEEE Journal on Selected Areas in Communications, Date of Publication: Jun. 1990, vol. 8, issue: 5 on pp. 915-933.*

Burel, "Detection of Direct Sequence Spread Spectrum Transmissions without Prior Knowledge" IEEE Globecom 2001.*

Burel, "Detection of spread spectrum transmissions using fluctuations of correlation estimators", IEEE/ISCAPS 2000.*

PCT International Search Report, dated Sep. 3, 2008, in connection with International Application No. PCT/EP2008/058096.

Hill, P. et al. "Techniques for detecting and characterising covert communication signals" Security and Detection, 1997. ECOS 97, European Conference on London, UK Apr. 28-30, 1997, London, UK, IEE, UK. Apr. 28, 1997, pp. 57-60, XP006507528, ISBN: 0-85296-683-0.

Ghasemi, A. et al. "Spectrum sensing in cognitive radio networks: the cooperation-processing tradeoff" Wireless Communications and Mobile Computing, [Online] vol. 7, No. 9, May 17, 2007, pp. 1049-1060, XP002461148. Wiley InterScience—www.interscience.wiley.com. Retrieved from the Internet: URL:http://www3.interscience.wiley.com/cgi-bin/fulltext/114264188/PDFSTART>.

Yeung, G. et al. "Search-Efficient Methods of Detection of Cyclostationary Signals" IEEE Transactions on Signal Processing, IEEE Service Center, New York, NY, US, vol. 44, No. 5, May 1996, XP011057442, ISSN: 1053-587X.

* cited by examiner

DETECTING THE PRESENCE OF SPREAD SPECTRUM SIGNALS

CROSS-REFERENCE TO RELATED APPLICATIONS

This application claims priority under 35 U.S.C. §119 to European Patent Application No. 07388049.4, filed Jun. 29, 2007, which is hereby incorporated herein by reference in its entirety. This application also claims the benefit of U.S. Provisional Application No. 60/947,485, filed Jul. 2, 2007, which is hereby incorporated herein by reference in its entirety.

TECHNICAL FIELD OF THE INVENTION

The invention relates to detecting, in a receiver for radio frequency signals, the presence of spread spectrum signals in a given frequency range.

DESCRIPTION OF RELATED ART

Cognitive radio is a new area which has recently received quite some attention. It is recognized that certain parts of the radio frequency spectrum are not utilized optimally. Either services that used to deploy the frequency bands are out of service (like TV frequencies in the US), or services are very geographically concentrated or only used during certain parts of the day. Spectrum regulators are seeking for more liberal allocation policies to allow a more efficient use of the spectrum, i.e. mechanisms that allow different users to share the spectrum. One of the first results of this quest has been the Ultra Wideband (UWB) ruling in the US by the Federal Communications Commission (FCC) in February 2002. Unlicensed UWB devices will be allowed to operate in the frequency band from 3 to 10 GHz under strict transmit power restrictions.

Radio devices that "steal" unused spectrum have to be intelligent to detect activity in the frequency bands and back off if the spectrum is used by primary users. The UWB ruling in Europe will require a Detect-And-Avoid (DAA) technique, i.e. detect any primary user and avoid any overlap in the frequency domain with this user. UWB radios are thereby the first cognitive radios in operation for commercial applications.

Of crucial importance for the cognitive radio is its ability to detect whether a frequency band is in use or not.

The most straight-forward way to check for spectrum occupancy is to measure the energy content of a frequency band. Without any signal present, only noise power will be measured. In case of a signal present, the measured power is a superposition of the signal power and the noise power.

Current investigations in the industry focus on the detection of Worldwide Interoperability for Microwave Access (WiMAX) signals. WiMAX operates in the 3.5 GHz band which is part of the spectrum allocated to UWB. WiMAX is based on an Orthogonal frequency-division multiplexing (OFDM) signal and needs a Signal-to-Noise ratio well above 0 dB. Detection mechanisms seem to be feasible for WiMAX.

However, advanced systems like Universal Mobile Telecommunications System (UMTS)/Wideband Code Division Multiple Access (WCDMA) are based on spread spectrum where the signals can be buried in the noise. The WCDMA receiver synchronizes to the spread signal and correlates with the known spreading codes. Due to the de-spreading, a processing gain is obtained which lifts the signal above the noise floor.

It will be understood that signals buried in noise will be difficult to detect for a cognitive radio. Simple power detection will not suffice as it will only show the noise power irrespective of the presence of the spread signal. In order to detect the spread signal, it needs to be de-spread which basically requires a spread spectrum receiver. It will be clear that low cost applications implementing UWB will not be able to bear the costs for an additional WCDMA receiver just for WCDMA detection.

Another disadvantage is the delay incurred to detect spread spectrum signals. The larger the spreading, the lower the signal-to-noise ratio during acquisition will be, and the longer the acquisition process takes. For cognitive radios that need agility to jump from band to band, a fast method for detection is required.

In Hill et al: "Techniques for detecting & characterizing covert communication signals", European Conference on Security and Detection, 28-30 Apr. 1997, Conference Publication No. 437 pp 57-60, IEE, it is mentioned that in direct sequence spread spectrum the spectrum of a binary phase shift keying (BPSK) modulated carrier exhibits phase and magnitude symmetry centered at the carrier frequency, with the lower and upper sidebands being the complex conjugate of each other, and that this fact can be utilized to reveal the presence of a BPSK signal buried in noise by correlating spectral components from the upper and lower sidebands of a present wideband signal. A peak value of a correlation function calculated over a window centered at a correlation centre frequency occurs when the correlation centre frequency is equal to the carrier frequency of a spread spectrum signal, while for other values of the correlation centre frequency the correlation between frequency samples over the window will be low. However, this procedure is computationally intensive and time consuming and therefore not suitable for the low cost applications in question here.

SUMMARY

Therefore, it is an object of the invention to provide a method of detecting the presence of spread spectrum signals in a given frequency range, which is simple and fast enough to be used in low-cost cognitive radios.

According to the invention the object is achieved in a method of detecting, in a receiver for radio frequency signals, the presence of spread spectrum signals in a given frequency range, the method comprising the steps of receiving a signal in said frequency range; determining for a measurement frequency in said frequency range an indication signal from the received signal; and using the determined indication signal as an indication of the presence of spread spectrum signals having a carrier frequency equal to said measurement frequency.

The object is achieved in that the step of determining the indication signal further comprises the steps of providing an in-phase signal and a quadrature signal by mixing the received signal with a locally generated oscillator signal having said measurement frequency; phase shifting at least one of said in-phase signal and said quadrature signal to provide two phase aligned signals; generating a sum signal of said phase aligned signals and a difference signal between said phase aligned signals; multiplying said sum signal by said difference signal to provide a multiplied signal; and low pass filtering said multiplied signal to provide said indication signal.

Like the method disclosed in the Hill et al. article mentioned above, this method utilizes the fact that a real signal, such as a BPSK signal, that is modulated on a radio frequency carrier exhibits lower and upper sidebands that are the complex conjugate of each other. However, in contrast to this known method, which for any measurement frequency has to perform the computationally intensive operations of determining frequency components in a frequency band below and a frequency band above the measurement frequency and correlating these components, the method suggested here just performs a few simple operations. For measurement frequencies different from frequencies on which a spread spectrum signal is modulated, the determined indication signal substantially only contains noise. However, when the measurement frequency equals a frequency, on which a spread spectrum signal is modulated, it is shown below that each one of the sum and difference signals represents frequency components in one of a frequency band above and a frequency band below the measurement frequency, i.e. the upper and lower sidebands that are the complex conjugate of each other, and that the multiplication of the sum and difference signals in this situation provides a signal that, when low pass filtered, indicates the presence of a spread spectrum signal at this frequency.

When the phase shifting step comprises the steps of phase shifting a first one of said in-phase signal and said quadrature signal to provide a phase shifted signal as one of said phase aligned signals; and using the other one of said in-phase signal and quadrature signal as the other one of said phase aligned signals, an even simpler implementation is achieved, since only one signal needs to be phase shifted.

In one embodiment, the phase shifting step comprises phase shifting said quadrature signal 90 degrees to provide the phase shifted signal as an in-phase signal.

The method may further comprise the steps of selecting said measurement frequency as one specific frequency that is a possible carrier frequency for spread spectrum signals, and using the determined indication signal as an indication of whether a spread spectrum signal is present at this specific frequency or not. This allows the detection of whether a specific frequency is already used by another user.

Alternatively, the method may further comprise the steps of sweeping said measurement frequency over a frequency band that includes a number of possible carrier frequencies for spread spectrum signals, and using the determined indication signal as an indication of frequencies in the band at which spread spectrum signals are present. This allows the detection of which frequencies in a frequency band that are used, and which are not, so that a cognitive radio can avoid those frequencies that are already used.

In one embodiment, the method further comprises the step of providing a pre-rotation at the bit rate prior to the determining step. In this way the method can also detect signals that apply offset-QPSK or pi/2 BPSK.

In one embodiment, the steps of the method are performed in an Ultra Wide-Band receiver.

As mentioned, the invention also relates to a receiver for radio frequency signals, arranged to detect the presence of spread spectrum signals in a given frequency range, the receiver comprising means for receiving a signal in said frequency range; circuitry for determining for a measurement frequency in said frequency range an indication signal from the received signal; and control circuitry arranged to use the determined indication signal as an indication of the presence of spread spectrum signals having a carrier frequency equal to said measurement frequency. Where the determining circuitry comprises mixers arranged to provide an in-phase signal and a quadrature signal by mixing the received signal with a locally generated oscillator signal having said measurement frequency; phase shifting means arranged to phase shift at least one of said in-phase signal and said quadrature signal to provide two phase aligned signals; adders arranged to generate a sum signal of said phase aligned signals and a difference signal between said phase aligned signals; a multiplying circuit arranged to multiply said sum signal by said difference signal to provide a multiplied signal; and a low pass filter arranged to filter said multiplied signal to provide said indication signal, then a receiver, which can detect the presence of a spread spectrum signal in a simple way, is achieved.

Embodiments corresponding to those mentioned above for the method also apply for the receiver.

BRIEF DESCRIPTION OF THE DRAWINGS

The invention will now be described more fully below with reference to the drawings, in which.

DETAILED DESCRIPTION OF EMBODIMENTS

Figure 1:
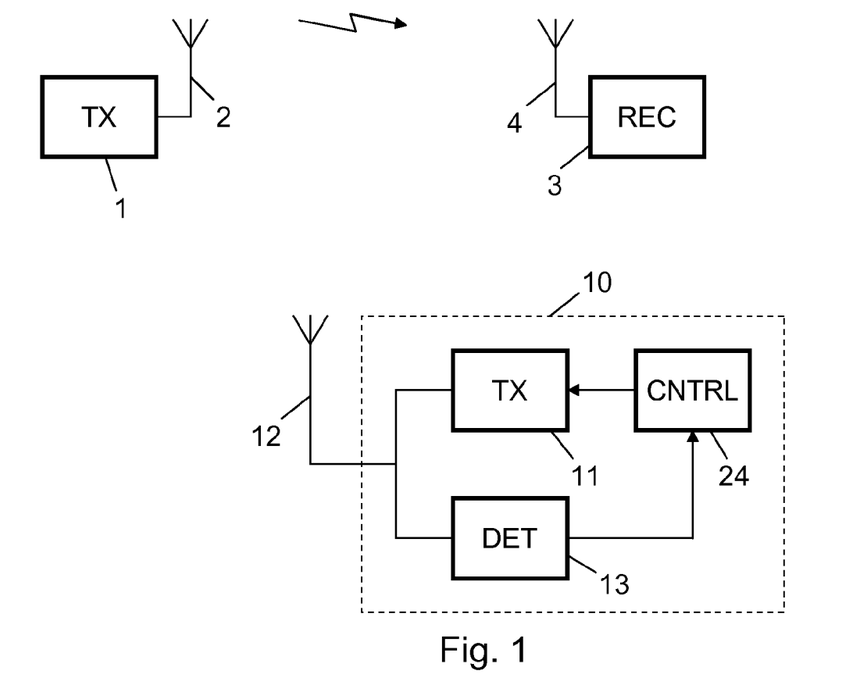
FIG. 1 shows an example of a situation in which the invention can be used.

FIG. 1 shows an example of a situation in which the invention can be used. A radio transmitter 1 is arranged to transmit from an antenna 2 spread spectrum signals to e.g. the corresponding receiver 3 arranged to receive such signals via an antenna 4. The spread spectrum signals are modulated on a given carrier frequency or on one of a number of carrier frequencies in a given frequency band. As an example, the transmitter 1 and the receiver 3 can be a base station and a mobile station, respectively, of a UMTS/WCDMA (Universal Mobile Telephone System/Wideband Code Division Multiple Access) mobile telephone system. Due to the spread spectrum character of the signals, they may be more or less buried in noise. The WCDMA receiver 3 synchronizes to the spread signal and correlates with the known spreading codes. Due to the de-spreading, a processing gain is obtained which lifts the signal above the noise floor. This system may be considered as a primary user of the given carrier frequency or the given frequency band.

Another radio device 10 is designed to transmit radio signals on a frequency or in a frequency band that could also be used by other users, such as the frequency or the frequency band used by the system comprising the transmitter 1 and the receiver 3. However, the radio device 10 is designed to use a frequency only if that frequency is not used by its primary users. Thus the radio device 10 is a so-called cognitive radio, and as an example it could be an Ultra WideBand (UWB) radio.

Such radio devices that "steal" unused spectrum have to be intelligent to detect activity in the frequency bands and back off if the spectrum is used by primary users. The UWB ruling in Europe will require a Detect-And-Avoid (DAA) technique, i.e. the device must detect any primary user and avoid any overlap in the frequency domain with this user.

Therefore, in addition to a transmitter 11 and an antenna 12, the radio device 10 comprises a detector 13, which can detect whether a given frequency is already used by a primary user or not, or detect which frequencies in a frequency band are already used and which are not, and a control circuit 24, which can control the transmitter 11 to use a frequency that is not already used by a primary user, or in other words, to not use a frequency that is already used by a primary user.

The detector 13 can be implemented in different ways depending on the type of signals to be detected. The most straight-forward way to check for spectrum occupancy is to measure the energy content of a frequency band. Without any signal present, only noise power will be measured. In case of a signal present, the measured power is a superposition of the signal power and the noise power.

However, with advanced systems like UMTS/WCDMA, which are based on spread spectrum, the signals can be buried in the noise, and it will be understood that signals buried in noise will be difficult to detect for a cognitive radio. Simple power detection will not suffice as it will only show the noise power irrespective of the presence of the spread signal.

Usually, the spread signal needs to be de-spread in order to be detected, which basically requires a spread spectrum receiver. It will be clear that low cost applications implementing UWB will not be able to bear the costs for an additional WCDMA receiver just for WCDMA detection.

Further, in a spread spectrum receiver a delay to detect the spread spectrum signals is incurred. The larger the spreading, the lower the signal-to-noise ratio is during acquisition, and the longer the acquisition process takes. For cognitive radios that need agility to jump from band to band, a fast method for detection is required.

Figure 2:
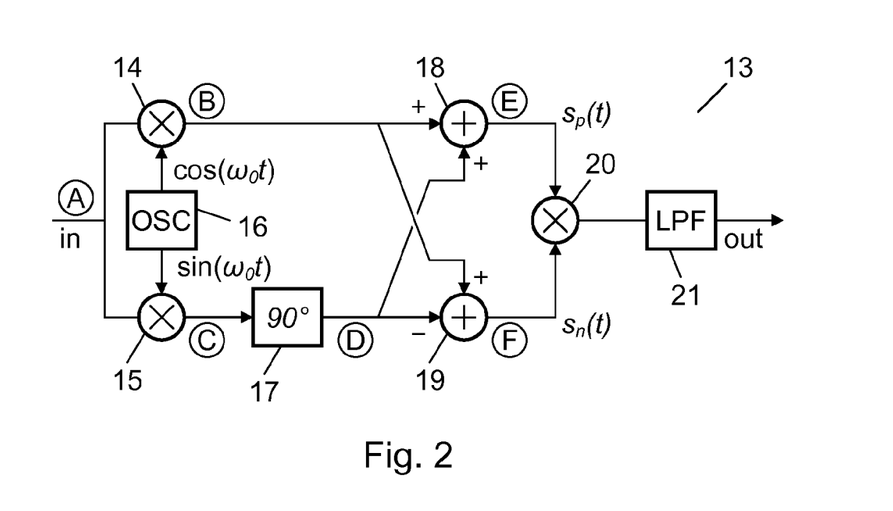
FIG. 2 shows a diagram of a detector circuit.

FIG. 2 shows an example of how a detector 13 that fulfils these requirements can be implemented.

This detector is based on the fact that it is known from signal theory that a real signal, such as a binary phase shift keying (BPSK) signal, that is modulated on a radio frequency (RF) carrier has an amplitude response which is symmetric around the carrier, whereas its phase response is anti-symmetric. Therefore, there is correlation between the signal components above the carrier and the signal components below the carrier. The noise above and below the carrier is uncorrelated. This phenomenon can be exploited to design a circuit in which the signal frequency components below the RF carrier are correlated with the signal frequency components above the RF carrier. The circuit used bears resemblance to the configuration applied in image rejection mixers. The upper and lower bands are extracted and then multiplied. If a real signal is present, a DC component at the output of the multiplier will reveal its presence.

The detector exploits the symmetry characteristics in the spectrum of an RF carrier modulated with a real signal. A real signal s(t) will have a Fourier transform $S_r(\omega)+j S_i(\omega)$, for which the real part $S_r(\omega)$ is symmetric, i.e. $S_r(\omega)=S_r(-\omega)$; and the imaginary part $S_i(\omega)$ is anti-symmetric, i.e. $S_i(\omega)=-S_i(-\omega)$. This characteristic results in a symmetric behaviour for the amplitude response $|S(\omega)|$ and an anti-symmetric behaviour for the phase response $\phi(\omega)$.

Figure 3:
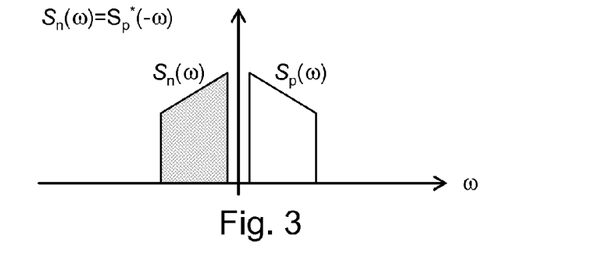
FIG. 3 illustrates that for a BPSK signal modulated on an RF carrier, the lower band will be the complex conjugate of the upper band.

When a BPSK signal (or any other one-dimensional signal) is modulated on a carrier with RF frequency $\omega_c$, the Fourier transform of the signal has the special properties that the lower band (the frequencies below the carrier frequency $\omega_c$) will be the complex conjugate of the upper band. This is illustrated in FIG. 3. Therefore, there is a clear correlation between the upper and lower band. In the detector, the lower band is correlated with the upper band, and the signal is thus lifted out of the noise. Noise in the channel will not have these symmetry properties and will not be lifted. By applying the method above, for the signal, a coherent accumulation of the frequency components will take place whereas the noise components are not added in phase.

The first part of the circuit shown in FIG. 2 resembles an image rejection (IR) mixer. However, in contrast to the image rejection mixer, in this case the image is a desired component. The image, which is the lower band, serves to correlate with the upper band. For this reason, the frequency that should be checked for the presence of a spread spectrum signal is down-converted to base band, which is similar to the function of a homodyne (zero-IF) mixer.

The signal received at the antenna 12 is input to the detector 13. In FIG. 2 this signal is marked "A". In order to achieve an in-phase version as well as a quadrature version of the down-converted signal, the input signal is fed to two mixers 14 and 15. In the mixer 14, the input signal is mixed with $\cos(\omega_0 t)$, where $\omega_0$ is the frequency of a local oscillator 16 corresponding to the frequency that should be checked for the presence of a spread spectrum signal, to provide a down-converted in-phase signal "B" (I-branch). Similarly, in the mixer 15, the input signal is mixed with $\sin(\omega_0 t)$ to provide a down-converted quadrature signal "C" (Q-branch).

Figure 4:
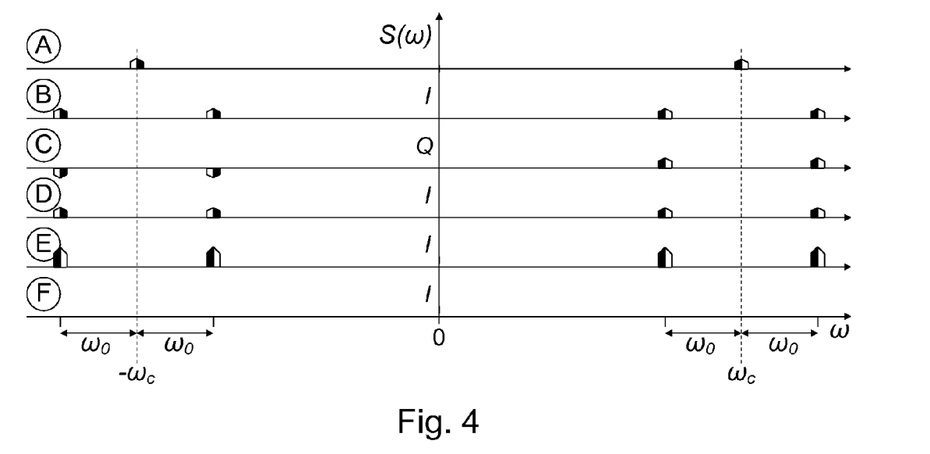
FIG. 4 shows the result of mixing a received signal including a spread spectrum signal with a frequency considerably lower than the carrier frequency of the spread spectrum signal.

To explain the function of these mixers, it is first illustrated in FIG. 4 how these signals could look, when a spread spectrum signal modulated on a carrier frequency $\omega_c$ is mixed with a frequency $\omega_0$ being considerably lower than the carrier frequency $\omega_c$. Signal "A" illustrates the upper and lower bands around the carrier frequency $\omega_c$ of a spread spectrum signal, as it was shown in FIG. 3. In each of the mixers 14 and 15, a copy of the incoming signal is shifted down in frequency by an amount of $\omega_0$ from the carrier frequency $\omega_c$. As seen in the figure, the mixers also shift a copy of the incoming signal up in frequency by an amount of $\omega_0$ from the carrier frequency $\omega_c$. However, these up-shifted images are less interesting here. Further, FIG. 4 illustrates that a corresponding set of images occur for negative values of $\omega$. Since $$\cos(\omega t) = \frac{e^{i\omega t} + e^{-i\omega t}}{2}$$

and $$\sin(\omega t) = \frac{e^{i\omega t} - e^{-i\omega t}}{2i},$$

symmetric images of the down-converted in-phase signal "B" will occur for negative frequencies, while for the down-converted quadrature signal "C" anti-symmetric images will occur for negative frequencies.

Figure 5:
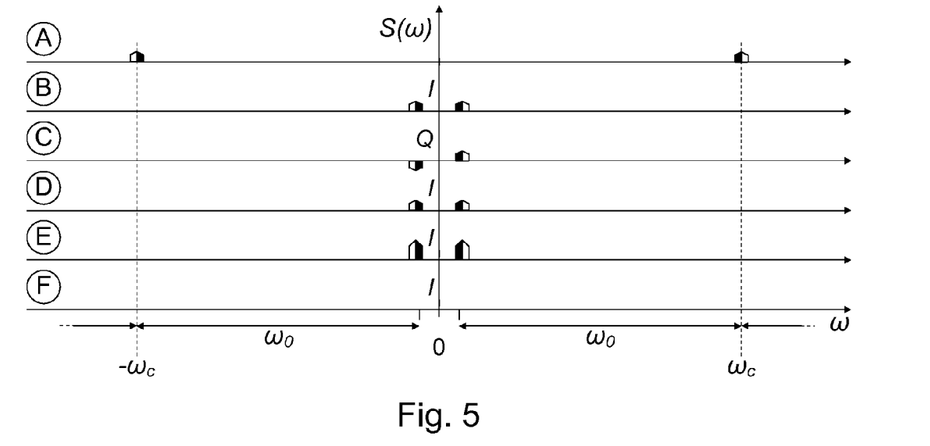
FIG. 5 shows the result of mixing a received signal including a spread spectrum signal with a frequency slightly lower than the carrier frequency of the spread spectrum signal.

Similarly, FIG. 5 illustrates how signals "B" and "C" could look, when the frequency $\omega_0$ is increased to be only slightly lower than the carrier frequency $\omega_c$ on which the spread spectrum signal is modulated. In that case the copies (positive and negative values of $\omega$) of the upper and lower bands around the carrier frequency $\omega_c$ are shifted down to frequencies close to but still different from base band. In FIG. 5, the up-shifted images mentioned above are not shown, since they will be outside the figure.

Figure 6:
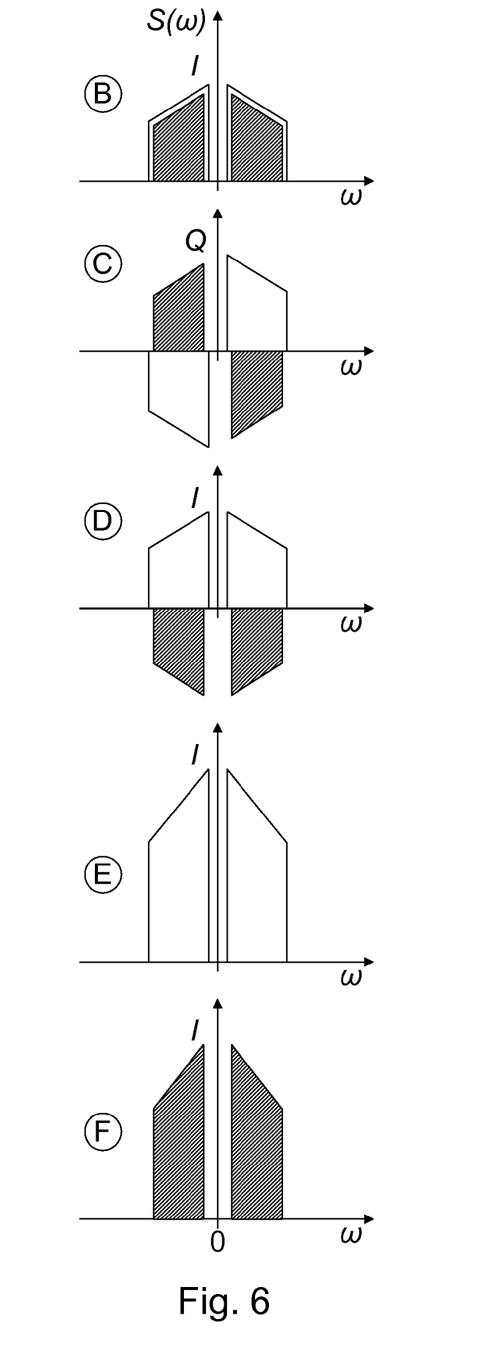
FIG. 6 shows the result of mixing a received signal including a spread spectrum signal with a frequency substantially equal to the carrier frequency of the spread spectrum signal.

If the mixing frequency $\omega_0$, i.e. the frequency of the local oscillator 16, is further increased to be equal to the carrier frequency $\omega_c$ on which the spread spectrum signal is modulated, the copies of the bands around the carrier frequency $\omega_c$ are shifted down to base band, and the upper and lower bands (corresponding to FIG. 3) of down-shifted copies of the signal will overlap as illustrated for signals "B" and "C" in FIG. 6. It is noted that in FIG. 6, the dashed lower band is shown as having a size slightly different from that of the upper band. This is done solely for drawing purposes, so that the bands can be distinguished from each other.

Returning now to FIG. 2, the down-converted quadrature signal "C" is fed through a 90 degree phase shifter 17. In signal theory, this corresponds to the Hilbert transform. As a result, the components for positive frequencies obtain a +90 degrees phase shift whereas the components for negative frequencies obtain a −90 degrees phase shift. It is noted that due to the 90 degrees phase shift the output signal "D" from the phase shifter 17 is now an in-phase signal. FIGS. 4, 5 and 6 illustrate the phase shifted signal "D" in the three situations described above. In FIGS. 4 and 5 the copies of the shown upper and lower bands in the phase shifted signal "D" will be similar to those of the in-phase signal "B", while in FIG. 6, due to the overlap of the bands around $\omega=0$, signal "D" will be quite different from signal "B".

Next, the down-converted in-phase signal "B" and the down-converted phase shifted signal "D" are added in an adder 18 and subtracted from each other in an adder 19. From FIGS. 4 and 5 it is seen that since the copies in the phase shifted signal "D" of the upper and lower bands of the signal modulated on the carrier frequency $\omega_c$ will be similar to those of the in-phase signal "B", the output signal "E" of the adder 18 (i.e. signal "B"+signal "D") will contain the same bands, just with twice the amplitude, while in the output signal "F" of the adder 19 (i.e. signal "B"−signal "D") these bands will be cancelled out.

However, from FIG. 6 it is seen that if the mixing frequency $\omega_0$, i.e. the frequency of the local oscillator 16, is selected to be equal to a carrier frequency $\omega_c$ on which a spread spectrum signal is modulated, the upper and lower bands of the signal modulated on the carrier frequency $\omega_c$ will be extracted, since in the output signal "E" of the adder 18 (i.e. signal "B"+signal "D") the copies of the lower band will be cancelled out so that the signal contains a copy of the upper band $S_p(\omega)$, or $s_p(t)$ in the time domain, while in the output signal "F" of the adder 19 (i.e. signal "B"−signal "D") the copies of the upper band will be cancelled out so that the signal contains a copy of the lower band $S_n(\omega)$, or $s_n(t)$ in the time domain. Thus in this situation, the signals of upper spectrum part $S_p(\omega)$ and lower spectrum part $S_n(\omega)$ are explicitly available, and as known from above they are their complex conjugates $S_n(-\omega)=S_p{}^*(\omega)$.

Signals "E" and "F" are then multiplied in the multiplier 20. Multiplication in the time domain corresponds to convolution in the frequency domain. Therefore, in the situation of FIG. 6, where the mixing frequency $\omega_0$ is selected to be equal to a carrier frequency $\omega_c$ on which a spread spectrum signal is modulated, multiplying signals "E" and "F" (i.e. $s_p(t)$ and $s_n(t)$) gives:

$$\Phi(\Omega)=\int S_p(\omega)S_n(\Omega-\omega)d\omega=\int S_p(\omega)S^*{}_p(\omega-\Omega)d\omega.$$

At DC, $\Omega=0$, this gives:

$$\Phi(0)=\int S_p(\omega)S^*{}_n(\omega)d\omega=\int |S_p(\omega)|^2 d\omega,$$

which is the power of the signal. Therefore, by low-pass filtering the output of the multiplier 20 in a low pass filter 21 a DC term (correlation output), which is proportional to the power of the spread signal, remains when the mixing frequency $\omega_0$ is selected to be equal to a carrier frequency $\omega_c$ on which a spread spectrum signal is modulated. For noise, the complex conjugate relationship is lacking and the DC term is zero. This will also be the case for the situations in FIGS. 4 and 5, i.e. where a spread spectrum signal is present, but at a carrier frequency different from the mixing frequency $\omega_0$. Therefore it is seen that the DC term occurs when the mixing frequency $\omega_0$ is selected to be equal to a carrier frequency $\omega_c$ on which a spread spectrum signal is modulated, while there is no DC term when no spread spectrum signal is modulated on a carrier frequency equal to the mixing frequency $\omega_0$. Thus an indication of the presence of a spread spectrum signal is achieved without the need for explicit de-spreading.

Any fixed phase rotation $\phi$ in the initial signal is reflected in the output (i.e. if only the real part of the output is considered, a $\cos(2\phi)$ relation is observed). Therefore, after the low-pass filtering, it would be advantageous to consider the output signal in the complex domain.

Furthermore, if the local oscillator frequency $\omega_0$ differs from the carrier frequency $\omega_c$ by $\Delta\omega$, the correlation output will occur for $\Delta\omega$ and not at DC. The low-pass filter 21 should accommodate for this shift. Usually, the spread spectrum signals (like WCDMA) have a fixed carrier allocation in the spectrum, so the detector will have a fairly good knowledge where the signal can be located. The RF carrier frequency does not need to be known very accurately.

Thus the circuit of FIG. 2 can detect in a simple way whether a spread spectrum signal is present on a given frequency, or in other words whether this frequency is already used by another user. The oscillator 16 is tuned to this frequency, and then the output of the low pass filter directly shows, whether a spread spectrum signal is present on this frequency or not. It is also possible to scan a frequency band for buried spread spectrum signals by sweeping the local oscillator frequency $\omega_0$ over that frequency band. A peak value then occurs in the output signal from the low pass filter 21 for each frequency on which a spread spectrum signal is modulated, and the control circuit 24 can then use this signal to control the transmitter 11 to avoid these frequencies.

As mentioned above, the conjugate relationship between upper and lower bands holds for one-dimensional signals (real signals or signals rotated with a fixed phase). Many spread spectrum systems apply complex modulation (on I and Q). However, the pilots and/or synchronization channels use a one-dimensional modulation. For example in WCMDA, the primary synchronization channel (P-SCH) is a one-dimensional signal since the spreading codes on the I and Q branches are identical. For the system to work, the signal to be detected needs to be one dimensional (a fixed phase rotation can be dealt with). Signals that apply offset-QPSK or pi/2 BPSK can also be detected, provided a pre-rotation at the bit rate is applied prior to detection. Only a coarse rate can be assumed, since the receiver is not locked to the spread signal. This will result in a beat frequency at the output of the detector.

Thus the invention provides a simple detection of spread spectrum signals without the need for de-spreading. Complex receivers with long acquisition times are therefore not needed. Low-cost cognitive radios (including UWB radios operating in the 3-10 GHz band) can be built that can accurately detect the presence of the spread signal.

Figure 7:
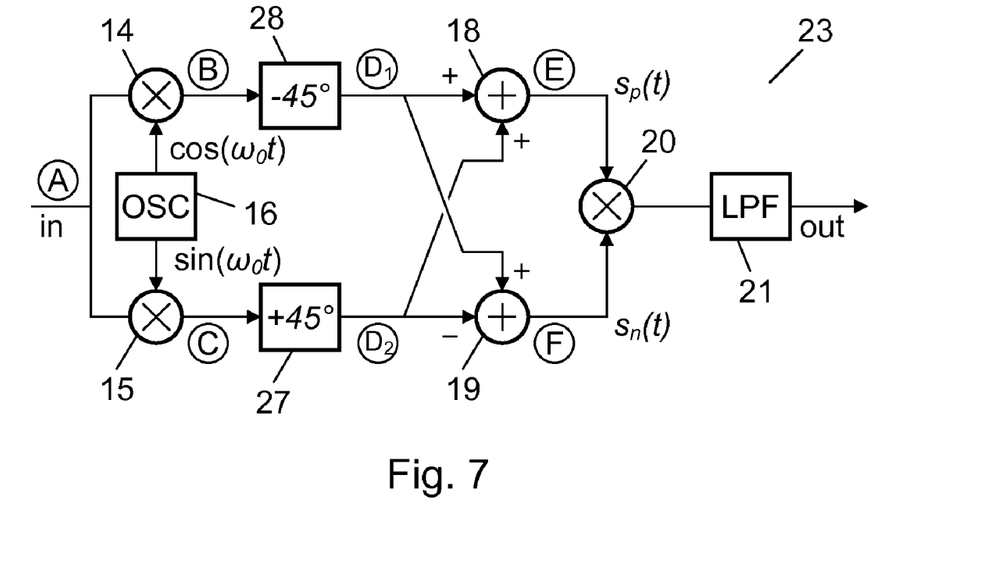
FIG. 7 shows a diagram of an alternative embodiment of a detector circuit.

In the circuit of FIG. 2, the down-converted quadrature signal "C" is phase shifted to be an in-phase signal, and the following signal processing is then performed on in-phase signals. It is noted that instead it would be possible to phase shift the down-converted in-phase signal "B" to be a quadrature signal and then perform the following signal processing on quadrature signals. More generally, it can be said that to be able to add and subtract the signals out of the two mixers 14 and 15, the signals need to be phase aligned in the complex domain. As mentioned above, this can be done e.g. by rotating the quadrature signal "C" by 90 degrees to map it to the in-phase signal "B", or by rotating the in-phase signal "B" by 90 degrees to map it to the quadrature signal "C". Whether the signals are rotated by +90 degrees or −90 degrees makes no fundamental difference; it is only a question of a change of sign. Further, since signals "B" and "C", which differ by 90 degrees, only need to be aligned, it could also be possible to rotate one of them by +45 degrees and the other one by −45 degrees, or more generally, one of them by X degrees and the other one by X−90 degrees (or X+90 degrees), so that their phase rotations differ by +90 or −90 degrees. As an example, FIG. 7 shows a circuit 23 similar to that of FIG. 2, except for the phase shifting of signals "B" and "C". In this circuit, the in-phase signal "B" is phase shifted −45 degrees in a phase shifter 28 to provide a first phase shifted signal "$D_1$", while the quadrature signal "C" is phase shifted +45 degrees in a phase shifter 27 to provide a second phase shifted signal "$D_2$". The phase shifted signals are then added and subtracted in the adders 18 and 19 as described for FIG. 2. It is noted, however, that phase shifting one of the signals by 90 degrees is simpler to implement, since only one phase shifter is needed.

Figure 8:
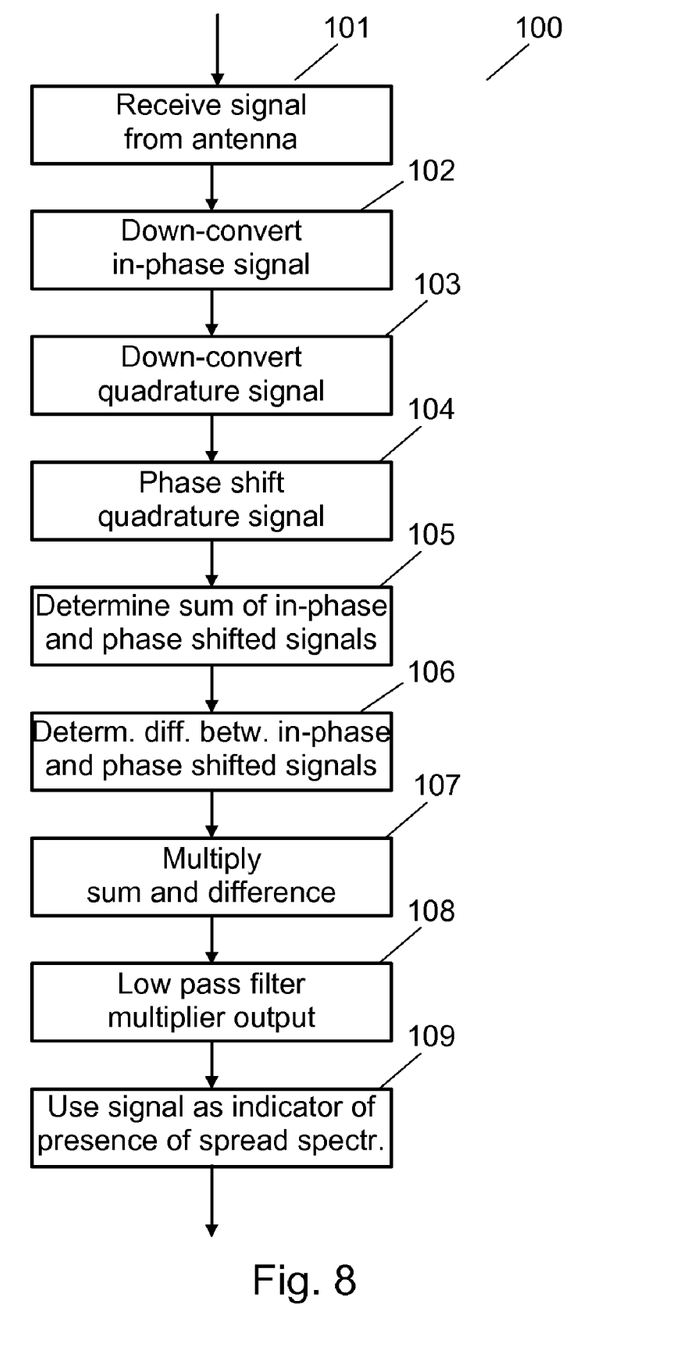
FIG. 8 shows a flow chart for a method of determining the presence of a spread spectrum signal.

FIG. 8 shows a flow chart 100 illustrating an example of how a method of determining the presence of a spread spectrum signal on a given carrier frequency can be implemented using the detector circuit of FIG. 2. In step 101 signal "A" is received at the antenna 12, and this signal is then down-converted in steps 102 and 103 to the in-phase signal "B" and the quadrature signal "C", respectively, by mixing the received signal with $\cos(\omega_0 t)$ and $\sin(\omega_0 t)$, where $\omega_0$ is the frequency of a local oscillator 16 corresponding to the frequency that should be checked for the presence of a spread spectrum signal. The down-converted quadrature signal "C" is then phase shifted 90 degrees in step 104 to obtain the phase shifted (now in-phase) signal "D" as described above in relation to FIG. 2. As mentioned above, the phase shifting of one or both of signals "B" and "C" may also be carried out differently, as long as the signals are phase aligned in the complex domain.

In step 105 the down-converted in-phase signal "B" and the down-converted and phase shifted signal "D" are added in the adder 18 to obtain the sum signal "E", and similarly, in step 106 the same signals are subtracted from each other in the adder 19 to obtain the difference signal "F". As described above, if the local oscillator frequency $\omega_0$ is equal to a carrier frequency $\omega_c$, on which a spread spectrum signal is modulated, the sum signal "E" will provide a base band version of the upper band of the modulated spread spectrum signal, while the difference signal "F" correspondingly will provide a base band version of the lower band of the modulated spread spectrum signal. If the local oscillator frequency $\omega_0$ is not equal to such a carrier frequency, this will not be the case. Thus the upper and lower bands are extracted only when $\omega_0$ equals such a carrier frequency.

In step 107, signals "E" and "F" are then multiplied in the multiplier 20, and the result of the multiplication is then low pass filtered in step 108. As mentioned above, multiplication in the time domain corresponds to convolution in the frequency domain. Therefore, when the mixing frequency $\omega_0$ is equal to a carrier frequency $\omega_c$ on which a spread spectrum signal is modulated, i.e. when signals "E" and "F" represent the upper and lower bands of the modulated spread spectrum signal, a DC value will occur at the output of the low pass filter 21 because of the complex conjugate relationship between the upper and lower bands of the modulated spread spectrum signal. For other frequencies, signals "E" and "F" are not correlated and except for a certain noise level no signal will occur at the output of the low pass filter. Thus when a DC signal is measured at the output of the low pass filter it indicates that a spread spectrum signal is present on the corresponding frequency, or in other words, that this frequency is already occupied by another user. Therefore, in step 109, this signal is used as an indicator of the presence of a spread spectrum signal, and the signal can be supplied to the control circuit 24, which then instructs the transmitter 11 to avoid a frequency already used by another user.

Although various embodiments of the present invention have been described and shown, the invention is not restricted thereto, but may also be embodied in other ways within the scope of the subject-matter defined in the following claims.

The invention claimed is:

1. A method of detecting, in a receiver for radio frequency signals, the presence of spread spectrum signals in a given frequency range, the method comprising the steps of:
   receiving a signal in said frequency range;
   determining for a measurement frequency in said frequency range an indication signal from the received signal; and
   using the determined indication signal as an indication of the presence of spread spectrum signals having a carrier frequency equal to said measurement frequency,
   wherein the step of determining the indication signal further comprises the steps of:
   providing an in-phase signal and a quadrature signal by mixing the received signal with a locally generated oscillator signal having said measurement frequency;
   phase shifting at least one of said in-phase signal and said quadrature signal to provide two phase aligned signals;
   generating a sum signal of said phase aligned signals and a difference signal between said phase aligned signals;
   multiplying said sum signal by said difference signal to provide a multiplied signal; and
   low pass filtering said multiplied signal to provide said indication signal.

2. A method according to claim 1, wherein the phase shifting step comprises the steps of:
   phase shifting a first one of said in-phase signal and said quadrature signal to provide a phase shifted signal as one of said phase aligned signals; and
   using the other one of said in-phase signal and quadrature signal as the other one of said phase aligned signals.

3. A method according to claim 2, wherein the phase shifting step comprises phase shifting said quadrature signal 90 degrees to provide the phase shifted signal as an in-phase signal.

4. A method according to claim 1, wherein the method further comprises the steps of:
   selecting said measurement frequency as one specific frequency that is a possible carrier frequency for spread spectrum signals, and
   using the determined indication signal as an indication of whether a spread spectrum signal is present at this specific frequency or not.

5. A method according to claim 1, wherein the method further comprises the steps of:
   sweeping said measurement frequency over a frequency band that includes a number of possible carrier frequencies for spread spectrum signals, and
   using the determined indication signal as an indication of frequencies in the band at which spread spectrum signals are present.

6. A method according to claim 1, wherein the method further comprises the step of providing a pre-rotation at the bit rate prior to the determining step.

7. A method according to claim 1, wherein the steps of the method are performed in an Ultra Wide-Band receiver.

8. A receiver for radio frequency signals, arranged to detect the presence of spread spectrum signals in a given frequency range, the receiver comprising:
   means for receiving a signal in said frequency range;
   circuitry for determining for a measurement frequency in said frequency range an indication signal from the received signal; and
   control circuitry arranged to use the determined indication signal as an indication of the presence of spread spectrum signals having a carrier frequency equal to said measurement frequency,
   wherein the determining circuitry comprises:
   mixers arranged to provide an in-phase signal and a quadrature signal by mixing the received signal with a locally generated oscillator signal having said measurement frequency;
   phase shifting means arranged to phase shift at least one of said in-phase signal and said quadrature signal to provide two phase aligned signals;
   adders arranged to generate a sum signal of said phase aligned signals and a difference signal between said phase aligned signals;
   a multiplying circuit arranged to multiply said sum signal by said difference signal to provide a multiplied signal; and
   a low pass filter arranged to filter said multiplied signal to provide said indication signal.

9. A receiver according to claim 8, wherein the phase shifting means is arranged to:
   phase shift a first one of said in-phase signal and said quadrature signal in a phase shifter to provide a phase shifted signal as one of said phase aligned signals; and
   use the other one of said in-phase signal and quadrature signal as the other one of said phase aligned signals.

10. A receiver according to claim 9, wherein the phase shifter is arranged to phase shift said quadrature signal 90 degrees to provide the phase shifted signal as an in-phase signal.

11. A receiver according to claim 8, wherein the receiver is further arranged to:
   select said measurement frequency as one specific frequency that is a possible carrier frequency for spread spectrum signals, and
   use the determined indication signal as an indication of whether a spread spectrum signal is present at this specific frequency or not.

12. A receiver according to claim 8, wherein the receiver is further arranged to:
   sweep said measurement frequency over a frequency band that includes a number of possible carrier frequencies for spread spectrum signals, and
   use the determined indication signal as an indication of frequencies in the band at which spread spectrum signals are present.

13. A receiver according to claim 8, wherein the receiver is further arranged to provide a pre-rotation at the bit rate prior to the determining step.

14. A receiver according to claim 8, wherein the receiver is an Ultra Wide-Band receiver.

* * * * *